United States Patent

[11] 3,588,794

| [72] | Inventor | Samuel A. Francis<br>Marion, Mass. |
|---|---|---|
| [21] | Appl. No. | 817,245 |
| [22] | Filed | Apr. 4, 1969 |
| [45] | Patented | June 28, 1971 |
| [73] | Assignee | The Buzzards Corporation<br>Marion, Mass.<br>Continuation of application Ser. No.<br>542,781, Apr. 15, 1966, now abandoned. |

[54] UNDERWATER DATA ACQUISITION DEVICE
22 Claims, 4 Drawing Figs.

[52] U.S. Cl...................................................... 340/3,
340/2
[51] Int. Cl...................................................... G01s 9/66
[50] Field of Search............................................ 340/3, 3
(T), 2, 10

[56] References Cited
UNITED STATES PATENTS

| 2,821,805 | 2/1958 | Kunze | 340/3 |
| 3,031,644 | 4/1962 | Hisserich | 340/2 |
| 3,153,220 | 10/1964 | Hagemann | 340/3 |
| 3,249,913 | 5/1966 | Smyth | 340/10 |
| 3,327,968 | 6/1967 | Converse | 340/3 |

Primary Examiner—Rodney D. Bennett, Jr.
Assistant Examiner—Joseph G. Baxter
Attorney—Nolte and Nolte ABSTRACT: The invention relates to an underwater data acquisition system wherein a sensing probe is deployed from an aircraft into a water medium. A sonar transmitter and receiver are located in the aircraft and are electrically connected to the probe. When the probe has reached a depth within the water medium at which the cavitation bubble collapses, that is when acoustical transmission from the probe is optimal, the sonar transmitter is caused to operate to transmit sonar energy to the probe.

Patented June 28, 1971

INVENTOR.
SAMUEL A. FRANCIS

BY Nolte and Nolte

ATTORNEYS

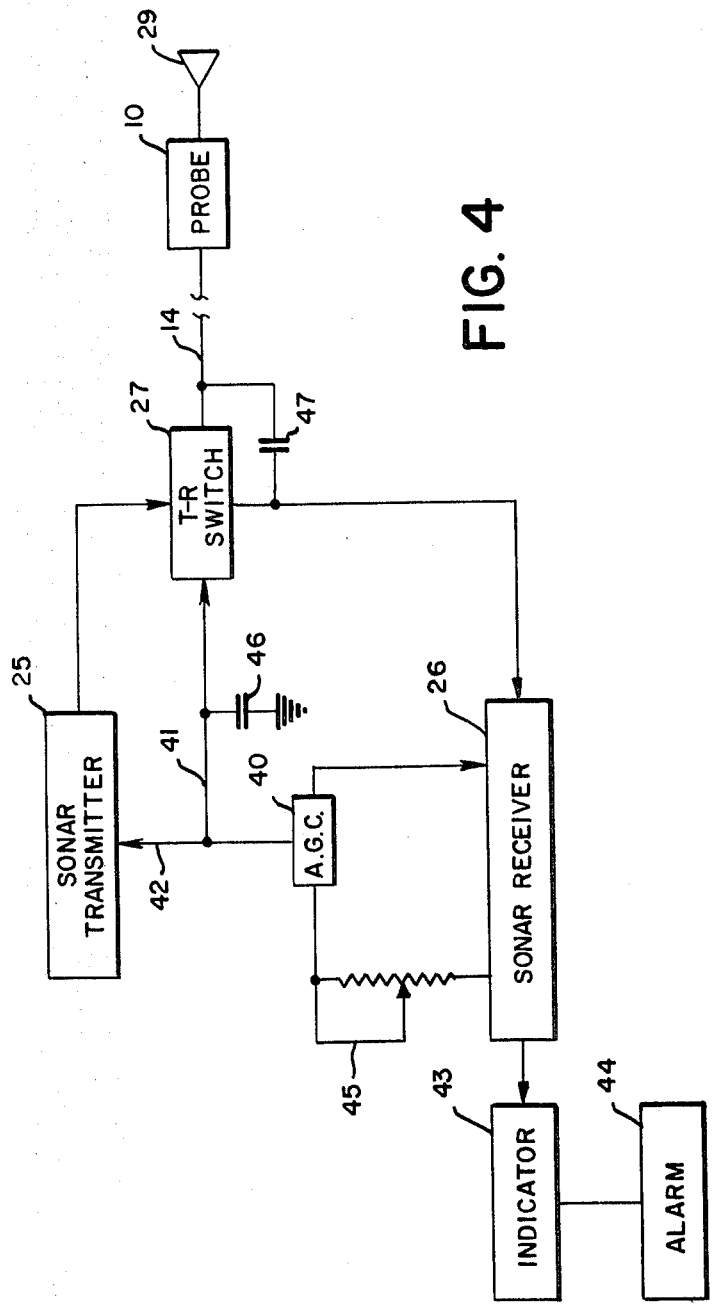

3,588,794

1

UNDERWATER DATA ACQUISITION DEVICE

This application is a continuation of Pat. application Ser. No. 542,781, filed Apr. 15, 1966, and now abandoned.

This invention relates to improvements in an underwater data acquisition device, and in particular to improvements in a device for the acquisition of data by means of an air towed underwater probe.

The determination of various properties of the ocean has significance in both military and commercial applications. Properties of the ocean such as the salinity, temperature, and density of the water, as well as the underwater noise, affect the propagation of acoustical energy through the water. Therefore, effective performance of such underwater data acquisition systems depends upon the transmission of acoustical or sonar energy for the transmission and receival of data. A system suitable for the acquisition of such data of ocean properties has been disclosed in Pat. application 544,653 filed Apr. 1, 1966, continuation of Ser. No. 384,438 filed on July 22, 1964, now U.S. Pat. No. 3,327,968 issued on June 27, 1967.

In the operation of the system described in said application, there exists a need to initiate the operation of the sonar transmitter at the earliest possible time during the data acquisition cycle. The term "ping" is used in the art to describe the transmittal of the sonar signal and will be used hereinafter in this application. The earliest time at which the ping could be transmitted is determined by the collapsing and clearing of the cavitation bubble formed by the probe as it enters the water. In this manner the quiet listening time of the received signal is extended to a maximum. It is therefore one of the objects of the present invention to ping the sonar system at a time determined by the collapse of the cavitation bubble.

It is a further object of the present invention to provide a timing and switching system by which the sonar transmitter and receiver, located in a sending apparatus, are controlled to operate only after a predetermined time, said time being a function of the position of the probe in the water.

The system in which the present invention finds particular utility includes a probe which may contain either a transducer, a sonar system, or other sensing devices which produce suitable electrical signals which are responsive to the water characteristics being investigated. The sensing probe may be towed in the water by an elastic cable suspended from an aircraft, or helicopter. When the cable is slack, the probe falls slowly through the water, during which time the desired data is obtained, or the sonar operation is performed. As the aircraft continues to move in a straight line, the cable tenses and stretches thus storing the potential energy. The tension of the cable exerts force on the probe which accelerates the probe up through the water. Once free from the water the potential energy of the tensed elastic cable is imparted to the probe so that it accelerates to a high degree and "flies" out of the water to a new location in which the cable again is slacked. The cycle continues to repeat in a stable manner.

Due to the shape of the probe and the high impact velocity, a cavitation bubble forms on the surface of the probe which will collapse when the probe velocity has been substantially reduced. Until this cavitation bubble has collapsed, acoustical coupling from the transducer to the water is inadequate. In accordance with the present invention, while the cavitation bubble exists, a programmer inhibits the operation of a sonar transmitter, to limit the transmission from the sonar transmitter, or transducer, only during periods of low noise, that is only when the probe is moving slowly through the water.

According to the aforesaid objects, a programmer is preset to fire the sonar transmitter after a short predetermined time interval following the collapse of the cavitation bubble. The programmer then initiates its cycle.

In another embodiment of the present invention a pressure sensitive switch is mounted on the body of the probe to transmit a pulse to the programmer when the cavitation bubble is collapsed.

2

Further features of the present invention and the advantages obtained by the use thereof, will be apparent from the following detailed specification taken in conjunction with the FIGS. of the drawings, in which:

FIG. 4 is another embodiment of a schematic block diagram of the apparatus of FIG. 1.

Figure 1:
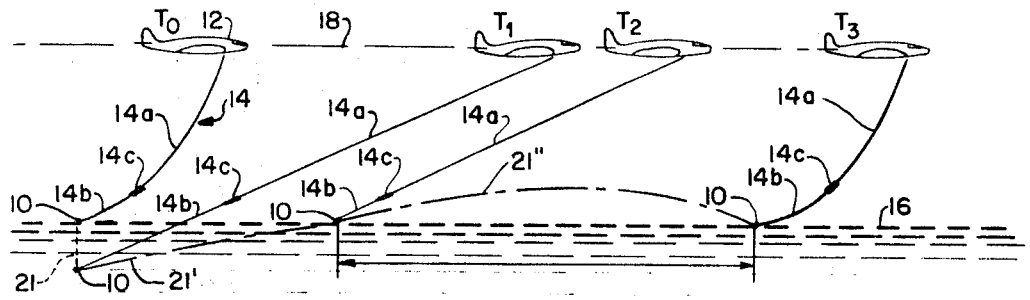
FIG. 1 is a schematic diagram showing the probe, probe cable and an aircraft towing the underwater detection apparatus in which the present invention finds particular use.

In the following specification and claims, the invention is not to be construed as limited to the acquisition of any specific type of data. The invention would have particular utility in an antisubmarine system in which sonar pings are emitted and their reflections are received during the free fall period of the probe's descent. However, the invention would have equal utility in measuring properties of the water, such as temperature, salinity, etc., under the conventional sensing devices such as thermistors or the like. In the following specification, neither the location of the data receiving circuitry nor the placement of the required transducers has been illustrated in the drawings, since these matters are of mere technical expediency and are well known to those skilled in the art.

FIG. 1 of the schematic diagram shows a probe towed by an aircraft by means of an elastic cable, in which the present invention may be employed during a normal cycle of operation. Thus, a probe 10 is connected to an aircraft 12 by means of an elastic cable 14. Elastic cable 14 may comprise conventional cable portions 14a and 14b between which is connected a highly resilient Section 14c. A body of water is shown as a broken line 18 along the longitudinal axis of the plane.

In FIG. 1 four different positions of the aircraft, cable and probe are shown. The cycle is considered to start at a time $T_o$, at which point the aircraft is at the extreme left of FIG. 1, probe 10 at the surface of water 16, and cable 14 in a slack condition between aircraft 12 and probe 10, with the resilient portion 14c in its normal or nonstretched condition.

During the first portion of the cycle, probe 10 descends vertically along the path indicated by dotted line 21. The vertical descent of the probe comprises the data acquisition or receiving portion of the cycle, and occurs as the probe, effectively free falls through the water. During this period the desired data is obtained and returned to the aircraft via the cable.

While probe 10 is descending, aircraft 12 continues along its path 18 to a position indicated at time $T_1$. At time $T_1$ the resilient cable portion 14c has been extended to its maximum length. At this time, the potential energy stored in the tensioned portion of 14c, starts to accelerate the probe to a velocity considerably above that of the aircraft 12, and the probe moves along path 21' to the surface of the water which it reaches at time $T_2$. Due to the great differential in the density between sea water and air, the acceleration of the probe as it leaves the water at time $T_2$, will cause the probe to "fly" ahead of aircraft 12 in a ballistic trajectory 21" and again land in the water at time $T_3$ to repeat the free fall and data acquisition period. The next cycle continues from time $T_3$ in the identical manner.

Figure 2:
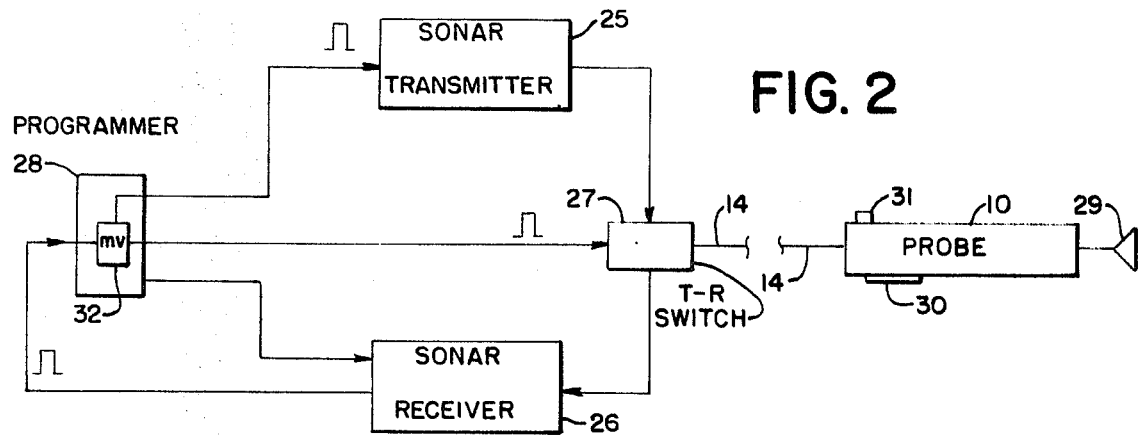
FIG. 2 is a schematic block diagram according to present invention as shown in the embodiment of FIG. 1.

One version of the present invention is shown in block diagram form in FIG. 2, showing the manner in which the sonar transmitter is timed in accordance with a signal received from the probe to initiate the sonar or pinging operation. The basic elements of the sonar equipment are housed in the aircraft 12 and, as shown in the block diagram of FIG. 2, comprise a sonar transmitter 25, a sonar receiver 26, and a T-R switch 27 which controls the operation of transmitter 25 and receiver 26 so that only one of these equipments may operate at a given time. As a result, the sonar system is either in the transmit or receive phase of operation. A programmer 28 controls the state of the T-R switch by transmitting a timing signal according to a method well known in the art. The cable 14 leads from the T-R switch to the probe 10. The cable 14 is of conventional construction and may be approximately 5,000 feet in length. The present invention provides means whereby the sonar transmitter 25 transmits the pinging signal through the cable 14 to the probe 10 through a transducer or antenna 29 disposed on the nose portion of the probe 10, as shown schematically in FIG. 2. During the pinging operation, the transducer operates as a transmitting antenna, transmitting sonar or acoustical energy into the water medium; and during the receiving phase of operation, the antenna serves to receive the reflected sonar signals for transmission to receiving apparatus 26 within the aircraft. It is desired to initiate the pinging operation when the cavitation bubble, which accompanies the probe 10 during the descent, collapses so that the transmitting is initiated only during the low noise phase of operation so when the acoustical coupling to the transducer is at a maximum as to achieve the maximum signal-to-noise ratio and therefore a greater sensitivity of information retrieval. A second transducer 30, which may in the form of a strain gauge, or any other pressure sensor, is mounted on the surface of the probe housing. When the probe descends into the water, cavitation bubbles will cling to the surface of the housing and will reduce the pressure about the sensor 30. Upon the collapsing of this bubble, the pressure will suddenly increase about the transducer 30, causing a pulse to be transmitted through the T-R switch 27 and receiver 26, to the programmer 28. Upon the receipt of the pulsed signal from the transducer 30 indicating the collapse of the cavitation bubble, a signal is sent from programmer 28 to both the transmitter 25 to trigger the transmitter into operation, and to the T-R switch 27 place the T-R switch in the transmitting mode of operation. Thus, it is seen that by the provisions of the present invention, the transmitting sequence is initiated only upon the probe reaching the depth for optimum sonar operation, and automatically switching to the receive mode after each transmission.

Another embodiment of the present invention relates to the placing of a preset time delay into the programmer 28, and having a transducer such as 31 mounted on the probe to transmit a signal upon the impact of the probe 10, upon the water. The transmitter is triggered into operation at a predetermined time delay $\tau$ from this impact time, as the time $\tau$ being the time for the probe to fall to its optimal transmitting depth, which can be readily calculated. The time $\tau$ may be implemented into the programmer by setting the time constant of a monostable multivibrator 32, so that when the initial signal from transducer 31 is received by the programmer 28, upon impact, programmer 28 will initiate a second pulsed signal displaced from the impact signal at the proper time delay, to produce a transmitter pulse to trigger the transmitter, and to set the T-R switch to initiate the pinging or transmitting operation.

Figure 3:
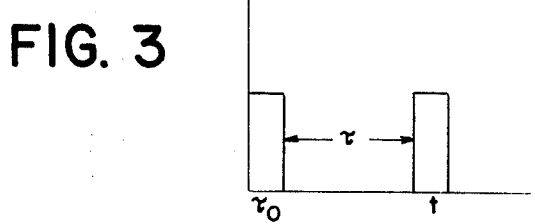
FIG. 3 is a pulse timing diagram showing the pulse sequence for the transmitter.

This operation is shown schematically in FIG. 3 in which the impact pulse is shown occurring at time $\tau_0$. The impact pulse is coupled through T-R switch 27 and receiver 26 to the programmer 28 wherein the impact signals trigger a monostable multivibrator 32, having a preset time constant to produce a second pulse displaced at an interval $\tau$ as shown in FIG. 3. This second pulse, triggers both sonar transmitter 25 and T-R switch 27 as shown in FIG. 2 to initiate the transmitting phase of the sonar data acquisition operation.

Referring to FIG. 4, there is shown another embodiment of a schematic block diagram of the apparatus according to the present invention of FIG. 1 where probe 10, having sonar transducer 29, is coupled by resilient cable 14 to T-R switch 27. Sonar receiver 26 however includes an automatic gain control circuit 40 (AGC) which as known by those skilled in the art produces a bias signal having a magnitude proportional to the signal input to receiver 26 from switch 27.

In the operation of the apparatus of FIG. 4, receiver 26 is initially turned on as probe 10 enters the water. As explained earlier, prior to the collapse of the cavitation bubble, transducer 29 transmits the turbulence of the water surrounding the cavitation bubble and the probe back to receiver 26. The noise signal as amplified by receiver 26 produces in AGC unit 40, a biasing signal on line 42 sufficient to maintain transmitter 25 in an OFF state. The bias signal coupled to line 41 is also sufficient to maintain switch 27 in a position so as to connect probe 10 to receiver 26. When the cavitation bubble collapses in front of the nose of the probe so that maximum acoustical coupling of the probe to the water is achieved, and the noise level has been reduced, the magnitude of the bias signal produced by AGC unit 40 decreases sufficiently to permit switch 27 to switch over to the transmit mode and to fire transmitter 25. Condenser 47, shown coupled from cable 14 to the input of receiver 26, permits a small portion of the transmitted signal to enter the input of the receiver. This portion of the transmitted signal causes the magnitude of the biasing signal produced by AGC unit 40 to increase in magnitude until the transmitter is turned off and switch 27 is returned to the receive mode.

It is obvious that some delay must be included in the switching operation in order to insure that the transmitter remains turned on sufficiently long to produce a ping having the desired pulse width. Therefore condenser 46 is provided, shown coupled to line 41 from ground to delay the buildup of the magnitude of the bias signal of the AGC unit until a ping is produced having the desired pulse width. In addition, a potentiometer 45 is shown coupled from the receiver to the input of unit 40 to control the magnitude of the maximum bias signal produced by unit 40 and thereby control the pulse or ping repetition rate of transmitter 25.

In addition, an indicator 43 is provided, coupled to receiver 26 to record the return pulses as sensed by the probe. An alarm 44 is also included, coupled to indicator 43 to either visually or audibly indicate the presence of a target.

In this embodiment of the invention, cable 14 need only be a two wire conductor since transducers 30 and 31 have been eliminated. This has not only the obvious advantage of simplifying the design and construction of the probe, but also improving the reliability of the overall system since fewer components and conductors are now required.

While I have shown preferred embodiments of my invention, I desire that the scope of this invention be limited only by the claims which are appended hereto.

I claim:

1. In an underwater data acquisition system, a probe adapted to be placed in a water medium, a remote transmitting means electrically coupled to said probe, means for controlling the operation of said transmitting means, transducer means electrically coupled to said controlling means mounted on said probe for indicating when said probe has been placed in the water medium, and means within said controlling means for producing a trigger responsive to, and time delayed from a signal received from said transducer means, said trigger initiating the operation of said transmitting means.

2. In an underwater data acquisition system comprising an underwater probe, an energy transmitter and receiver remote from and electrically coupled to said probe, and programming circuitry for controlling the operation of said transmitter and receiver, the improvement comprising; a transducer mounted on said probe and electrically coupled to said programming circuitry responsive to the impact of the probe in the water, trigger generating means within said programming circuitry receiving a first signal from said transducer and producing a transmitter trigger signal at a predetermined time interval from said first signal.

3. The combination of claim 2, wherein said trigger generating means comprises a multivibrator.

4. An underwater data acquisition system comprising a sonar system, an underwater probe electrically coupled to said sonar system, and pressure sensitive transducer means associated with said probe and responsive to the collapsing of a cavitation bubble surrounding said probe for transmitting a signal to said sonar system when said cavitation bubble has collapsed.

5. An underwater data acquisition device comprising an underwater probe, a sonar system remote from and electrically coupled to said probe, said sonar system comprising, a transmitter, a receiver, a transmit-receive switch for establishing the mode of operation of said sonar system, a programmer electrically coupled to said transmitter receiver and transmit-receive switch for controlling the operation thereof, a transducer associated with said probe electrically coupled through said switch to said programmer, sending a first signal to said programmer upon the impact of said probe in the water, and means within said programmer for producing a second signal at a predetermined time delay from said first signal, said second signal initiating the operation of said transmitter.

6. The device of claim 5, wherein said signal producing means comprises a multivibrator.

7. The device of claim 6, wherein said predetermined time delay is substantially equal to the time between the time of the probe impact on the water and the time for the probe to come substantially to rest in the water.

8. A method of obtaining data from an underwater probe electrically coupled to an energy transmitter, comprising the steps of dropping the probe into a water medium, transmitting a first signal to said transmitter upon the impact of said probe upon the water, producing a second signal at a predetermined time delay from said first signal, and pinging said transmitter with said second signal, wherein said time delay is substantially equal to the time between the probe impact on the water and the time at which said probe comes substantially to a rest position in the water.

9. A method for obtaining data from an underwater probe electrically coupled to an energy transmitter, comprising the steps of dropping said probe into a water medium and pinging said transmitter at a predetermined time delay after said probe has made impact with the water medium, said time delay being substantially equal to the time interval between the impact of said probe in the water medium and the collapsing of a cavitation bubble which forms on the surface of said probe during the descent thereof into the water medium.

10. The method as recited in claim 9, further comprising the steps of connecting said probe to an aircraft, periodically causing said probe to rise from the water, and dropping said probe into the water after it has been raised therefrom.

11. An underwater data acquisition system comprising an aircraft, an energy transmitting system housed in said aircraft, an underwater probe, a length of cable electrically connecting said probe to said transmitting system, and means responsive to the collapse of a cavitation bubble surrounding at least a portion of said probe for pulsing said system into operation.

12. An apparatus for acquiring data from an underwater probe adapted to be deployed from an aircraft into a water medium comprising, an energy transmitting system housed within said aircraft, and means responsive to the time required for the collapse of a cavitation bubble surrounding at least a portion of said probe for pulsing said transmitting system into operation when said probe is substantially at the lowest depth of its descent within the water medium.

13. An apparatus for acquiring data from an underwater probe as defined in claim 12, wherein said pulsing means comprises means for generating a transmitter firing trigger at a predetermined time after said probe has landed in the water.

14. An apparatus for acquiring data from an underwater probe as defined in claim 13, wherein said trigger generating means comprises a monostable multivibrator.

15. An underwater data acquisition apparatus comprising a sonar system including a transmitter and a receiver, an underwater probe having a transducer electrically coupled to said sonar system and means associated with said receiver responsive to the noise level of a signal coupled from said transducer to said sonar system for controlling the operation of said transmitter, wherein said noise responsive means comprises an automatic gain control circuit for producing a biasing signal having a magnitude proportional to the magnitude of the input signal received by said receiver from said probe, said biasing signal being coupled to said transmitter for maintaining said transmitter turned off until the acoustical coupling of the water to said transducer is at a maximum.

16. The apparatus as recited in claim 15 further comprising a first condenser coupled to the output of said automatic gain control circuit, said condenser having a capacitance sufficient to maintain said transmitter turned on until a sonar ping is produced by the transducer coupled to said transmitter having a predetermined pulse duration.

17. The apparatus as recited in claim 16 further comprising a potentiometer coupled to said automatic gain control circuit for controlling the maximum magnitude of said biasing signal so as to control the pulse repetition rate of said transmitter.

18. In a data acquisition system of the type having a probe adapted to be placed in a body of water in such a manner that a cavitation bubble forms on the surface of said probe, wherein said probe includes sensor means for producing a signal corresponding to the data to be acquired when said probe is in said body of water, and wherein said system further comprises a remote station electrically connected to said sensor means; the improvement comprising means for inhibiting acquisition of said data by said remote station during the time said cavitation bubble surrounds at least a portion of said probe.

19. The data acquisition system of claim 18 further comprising means on said probe responsive to a cavitation bubble surrounding said portion of said probe means, said inhibiting means being responsive to said means responsive to said cavitation bubble for inhibiting said acquisition of data.

20. The data acquisition system of claim 19 wherein said means responsive to a cavitation bubble comprises a pressure sensor on said probe.

21. The data acquisition system of claim 19 wherein said means responsive to a cavitation bubble comprises a noise sensor responsive to noise generated by said cavitation bubble.

22. The data acquisition system of claim 19 wherein said means responsive to a cavitation bubble comprises means responsive to the impact between said probe and said water, and means responsive to said last mentioned means for producing a signal that is delayed in time with respect to said impact, whereby said last mentioned signal occurs at a time following said impact when said bubble has collapsed.